Aug. 13, 1968 A. R. MOELLER 3,397,385

VEHICLE COURSE AND TURN TIMER APPARATUS

Filed July 17, 1964

INVENTOR
ALONZO R. MOELLER
BY *Townsend and Townsend*
ATTORNEYS

United States Patent Office

3,397,385
Patented Aug. 13, 1968

3,397,385
VEHICLE COURSE AND TURN TIMER
APPARATUS
Alonzo R. Moeller, 1706 Cherrytree Lane,
Mountain View, Calif. 94040
Filed July 17, 1964, Ser. No. 383,424
6 Claims. (Cl. 340—23)

ABSTRACT OF THE DISCLOSURE

A vehicle course and turn timer having a timing circuit with a capacitor, a selectable series of resistors for controlling the charging rate of the capacitor and a diode and a unijunction transistor operable with the time integrated voltage at the end of the time interval for operating a warning signal with the diode conducting to the unijunction transistor when the capacitor is discharged. The timer is tested by shunting the resistors for a short timing interval and means are provided for momentarily interrupting the power to the timing circuit for reinitiating the time interval of the timing circuit.

---

Figure 1:
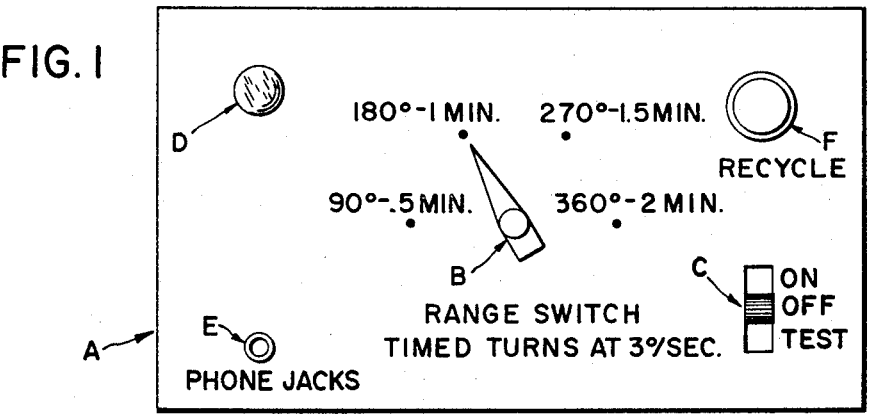

The present invention relates in general to a timing device utilizable in aircraft for navigation.

In aircraft navigation it is often necessary to perform certain maneuvers in a specified period of time. For example, the ground speed of an airplane can be calculated by first flying a straight and level course at a constant air speed for a specific length of time and then determinating the distance travelled by use of charts. The distance travelled and the specific time interval enable the pilot to calculate his ground speed and the ratio of his ground speed to air speed.

An even more important operation is the timed turn utilized in instrument flying in which a turn is made at the standard turn rate of three degrees per second for a specified time in order to accomplish a turn through a specific angle. For example, a typical 180° turn is a turn at the rate of 3° per second for exactly one minute. Such turns are typically practiced under instrument weather conditions for reversing one's direction to avoid bad weather or for remaining in a specified "hold" pattern.

The major difficulty in utilizing timing information either for course or turn navigation lies in the fact that the pilot must concentrate on performing a number of different functions during the timing period so that the pilot may either misread his clock, forget the reading that he made on his clock or misjudge a time interval due to the circumstances transpired during the time period. For example, in the case of instrument flying the pilot must continuously watch his turn-bank indicator, air speed indicator and compass during the turn and may also have to fight the controls if the weather is turbulent.

The object of the present invention is to provide a course and turn indicator which can be instantaneously actuated for timing selectable standard intervals and which will signal the pilot when the interval is complete.

Broadly stated the invention relates to an aircraft course and turn time which includes a timing circuit having a selectable timing interval for producing a time integrated voltage to a switching transistor operable with the time integrated voltage at the end of the timing interval to produce a warning signal for warning the pilot of the end of the timed interval.

This course and turn timer can be adjusted to time accurately the standard intervals encountered in aircraft navigation and warn the pilot at the end of the interval so that the pilot can devote his entire attention during the timed interval to other necessary matters involved with handling the airplane thereby preventing errors in navigation.

Another aspect of the present invention is the provision of a recycling switch in the timing device for momentary interrupting the power supplied to the timing circuit for either repeating or interrupting and reinitiating the timed interval. This provision permits multiplication of the timing interval for timing longer intervals in case such are desired, or for repeating the same interval as desired, such as, for example, in the case where the pilot desires to repeat a maneuver in a subsequent identical time. Additionally this provision of the invention permits the pilot to make a correction during the timing interval for reinitiating the timing interval. Thus, in case a pilot makes a false start on a turn and shortly thereafter again begins the turn, he need only press the recycle button on the timer at the beginning of his second start on the turn to accurately time the turn. Similarly if a pilot is in the middle of a turn and due to some unforeseen circumstances wishes to begin a new turn of the same duration as originally planned he need only press the recycle button at that instant so that the timing cycle can be reinitiated.

The timing device in accordance with the present invention can also be provided with a testing circuit whereby the timing interval is foreshortened to a short interval such as, for example, one second for a quick test of the operability of the device. This provision permits the pilot to verify the performance of the timing device during a very short period of time before initiating a timing cycle. This feature can be extremely advantageous when the pilot is involved in hazardous weather conditions.

In the preferred embodiment of this invention the warning signal to the pilot includes both a warning light and a warning tone which when operated simultaneously serve as a backup or safety check against one another. Naturally, the warning light and warning tone may be operated independently.

In accomplishing the foregoing features and advantages of the present invention a timing device is provided which has all silicon solid state circuitry for high reliability and low power consumption.

Other features, objects, and advantages of the present invention will become more apparent upon perusal of the following specification in conjunction with the accompanying drawing wherein similar characters of reference represent similar structure in each of the separate views.

Figure 2:
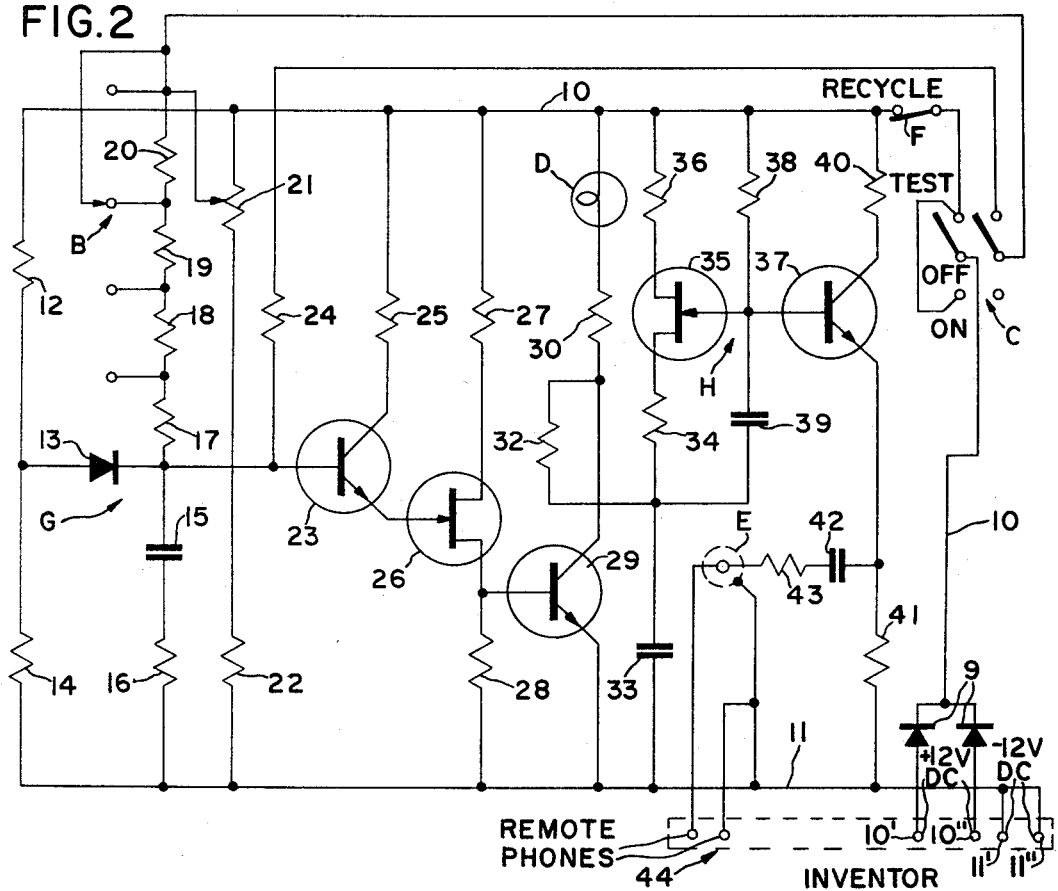

In the drawing:

FIG. 1 is an elevational view of the front panel of an aircraft course and turn timing device in accordance with the present invention for illustrating operation of the device, and FIG. 2 is a circuit diagram of a course and turn timing device in accordance with the present invention.

Referring now to the drawing with particular reference to FIG. 1 which illustrates an elevational view of the front panel A of a course and turn timing device in accordance with the present invention, the device includes a range switch B for selecting one of several standard extended time intervals useful for aircraft navigation. Typical intervals are ½, 1, 1½, and 2 minutes which when turning in a standard turn of 3° per second amount respectively to the time necessary for making 90°, 180°, 270°, and 360° turns. Naturally, the timer can be provided with more than four positions to time other intervals desired. The panel also includes a power switch C such as, for example, the sliding contact switch shown or a toggle switch, for operating either on one of the extended timing intervals mentioned above or on a very short such as, for example, one-second testing intervals for testing operation of the device.

When the device is operated by the power switch C, a warning signal is produced at the end of the timed interval by a signal lamp D and by an audio tone generated for production in the pilot's ear phones which can be plugged into the instrument in phone jack E. The warning signal is produced at either the lamp D, the pilot's ear phones, or by both the lamp and the ear phones to signal the pilot when the selected time interval has been completed thereby relieving the pilot from necessity of either judging the time interval or keeping track of the elapsed time during the interval on his instrument panel clock. Naturally, the audio tone can be fed to a speaker as well. When the lamp and audio tone are operated together they serve as a back up or safety check against one another.

As an additional feature of the invention the timing device panel is provided with a recycle switch button F which can be depressed to interrupt or repeat the timing cycle. In this manner the pilot can reinitiate the timing cycle by depressing the button F either during or after the end of the timing cycle to reinitiate or repeat the timing cycle for repeating his maneuver or multiplying the timing interval elapsed at the end of a timing cycle.

Referring now to FIG. 2 illustrating the circuit of the timing device, operating power for the device is provided to a positive bus 10 and a negative bus 11 either from positive and negative contacts 10' and 11' connected to the aircraft electrical system or positive and negative contacts 10" and 11" connected to an emergency battery. The input power is connected from either the contact 10' or the contacts 10" through diodes 9 to the power switch C such as, for example, a double-pole, double-throw switch utilizable for operating the device on either the timing or testing cycle. For a timing cycle one throw of the switch C connects positive voltage through the recycle switch button F, the positive bus 10 to a resistor 12 which is connected to a diode 13 in the timing circuit G and to the negative bus 11 by resistor 14. The opposite side of the diode 13 is connected to: (a) a firing capacitor 15 which is in turn connected to the negative bus 11 by a resistor 16; (b) the range switch B which, for the four timing intervals illustrated in FIG. 1, is a single pole four position rotating switch rotatable for connection into a series of resistors 17, 18, 19 and 20 which are connected through a variable resistor or calibration potentiometer 21 and resistor 22 to negative bus 11; and (c) to the base of an emitter-follower transistor 23. For the testing cycle the diode 13 is also connected by the other throw of power switch C through a resistor 24 to bus 11 through the variable resistor 21. The resistors are selected so that their resistance when taken above or in combination are such as to produce an accurate integrated voltage to produce accurate time delays of the duration desired.

The transistor 23 has its collector connected through a resistor 25 to the positive bus 10 and its emitter connected to the rectifying contact of a switching unijunction transistor monostable oscillator 26 which is activated for one timing cycle each time the supply voltage is applied. The transistor 26 has its one ohmic contact connected through resistor 27 to positive bus 10 and its other ohmic contact connected to the base of a transistor 29 and through resistor 28 to ground. Transistor 29 has its emitter connected to negative bus 11 and its collector connected to the circuitry of the warning devices described in greater detail below.

The emitter-follower 23 provides current gain between the timing circuit G and the transistor 26 so that reverse emitter leakage current of the transistor 26 will not disturb the accuracy of the timing circuit G while the diode 13 and resistor network of the timing circuit G provide a starting voltage for the timing operation which is independent of the temperature-dependent valley point voltage of the unijunction transistor 26. The calibration potentiometer or variable resistor 21 adjusts the final value of the charging voltage on all selected ranges.

In a typical operation the pilot wishing to time a specific interval such as, for example, 60 seconds for a 180° turn adjusts the range switch to the location designated 180°–1 minute and turns on the power switch C at the beginnig of the turn. When the power switch C is closed to supply power to the timing circuit, capacitor 15 charges toward the supply voltage with a time constant dependent upon the number and value of resistors 17–20 which are selected in the timing circuit G. When the voltage at the base of the transistor 23 reaches and slightly exceeds the critical peak point voltage of the transistor 26 a regenerative turn-on switching action occurs in the transistor 23 and current flows through the transistor 26 discharging the capacitor 15 to a voltage where the diode 13 conducts. The current flow through the diode 13 is multiplied by the current gain of the transistor 23 to provide sufficient gain to exceed the valley point current of the unijunction transistor 26 thereby holding transistor 26 latched in the on state, and current flows through the unijunction transistor 26 and transistor 29 to the warning device circuitry.

In the warning device circuitry the transistor 29 has its collector connected through a resistor 30 and the lamp D to the positive bus 10 and through a resistor 32 to an oscillator circuit H. The resistor 32 is connected through a capacitor 33 to bus 11 and through resistor 34, unijunction transistor 35 and resistor 36 to the positive bus 10. The transistor 35 is a simple astable relaxation operating circuit to develop an audio tone with a frequency of about 500 c.p.s. which is delivered to an audio output terminal or phone jack E at a level adequate for ear phone operation by an emitter-follower transistor 37. The base of the transistor 37 is connected to the rectifying contact of the transistor 35, to the positive bus 10 through resistor 38 and through capacitor 39 to the capacitor 33. The transistor 37 has its collector connected through resistor 40 to the positive bus 10 and has its emitter connected both through a resistor 41 to the negative bus 11 and through a capacitor 42 and a resistor 43 to the phone jack E. The terminal connections of the device are provided with leads 44 for connecting remote ear phones for production of the warning tone. Also, the warning tone at the ear phone jack E can be connected to additional amplifier stages to drive a speaker (not shown).

The current flow through the unijunction transistor 26 develops a positive voltage at the base of transistor 29 which permits transistor 29 to turn on and saturate thereby illuminating the lamp D and applying supply voltage to the transistor 35 for production of the audio output at the phone jack E.

The light and tone outputs continue to operate until the unit is either turned off or recycled by the recycle switch button F which removes supply voltage so that the emitter latching current in transistor 26 is reduced to zero to turn off the transistors and ready the timing circuit for another timing cycle. If the recycle button is pressed during an operating timing cycle, the cycle is begun over again, or if this button F is pressed at the end of a timing cycle when the light and tone outputs are operating, the cycle is repeated. Thus, with this latter procedure multiples of a given timing interval selected with a particular set of resistors 17–20 can be produced. The recycle button permits the pilot to initiate a new timing cycle at any time whether a timing cycle is in progress or has been completed.

When the power switch C is switched for test operation, resistor 44 is shunted across resistors 17–20 to reduce the timing cycle to a minimume such, as for example, one second for testing operation of the device. With this testing circuitry the device can be instantaneously tested by the pilot who, due to extenuating circumstances, may wish to test the device and then immediately being a timing interval for a turn which he is about to begin.

In a typical operation, if the pilot wishes to test operation of the device before he starts a timing cycle he turns the power switch C to the test position which shunts resistor 44 across resistors 17–20 and produces a test time interval of approximately one second after which the warning light and tone go on to indicate that the timing device is functioning properly and is ready for use.

The pilot may utilize the range switch B and recycle button F to add time intervals such as, for example, at the end of a one minute interval the pilot can reposition the range switch B to the 1.5 minute setting, depress the recycle button F and wait until the light and tone are again initiated at the end of a total elapsed time of 2.5 minutes or 450° for a standard 3° per second turn.

While the above description and accompanying drawing are believed sufficient to teach the practice of the present invention the following table is set forth to illustrate the type and rating of the principal operating elements of a timing device constructed in accordance with this invention:

| Element No.: | Element | Rating | Type |
|---|---|---|---|
| B | Range Switch | | Rotating 1 pole, 4 position. |
| C | Power Switch | | Sliding contact, DPDT. |
| D | Lamp | 7 v | No. 765. |
| F | Recycle Switch | | Push button, SPST. |
| 9 | Diode | | GE 1N92. |
| 12 | Resistor | 10K | |
| 13 | Diode | | 1N457. |
| 14 | Resistor | 3.3K | |
| 15 | Capacitor | 47 μF./35 v | T1 5CM. |
| 16 | Resistor | 47 | |
| 17 | do | 330K | |
| 18 | do | 330K | |
| 19 | do | 330K | |
| 20 | do | 330K | |
| 21 | Variable Resistor | 2.5K | |
| 22 | Resistor | 10K | |
| 23 | Transistor | | 2N2712. |
| 24 | Resistor | 2.2K | |
| 25 | do | 470 | |
| 26 | Transistor | | 2N2646 |
| 27 | Resistor | 680 | |
| 28 | do | 100 | |
| 29 | Transistor | | 2M2712. |
| 30 | Resistor | 68 | |
| 32 | do | 330 | |
| 33 | Capacitor | 2 μF./50 v | |
| 34 | Resistor | 47 | |
| 35 | Transistor | | 2N2646. |
| 36 | Resistor | 100 | |
| 37 | Transistor | | 2N2712. |
| 38 | Resistor | 22K | |
| 39 | Capacitor | 0.1 μF./50 v | |
| 40 | Resistor | 100 | |
| 41 | do | 1K | |
| 42 | Capacitor | 2 μF./50 v | |
| 43 | Resistor | 470 | |

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An aircraft course and turn timer, including a timing circuit having a selectable timing interval for producing a time integrated voltage, said timing circuit including a capacitor and a selectable series of resistors for controlling the charging rate of said capacitor for a desired timing interval, means for providing power to said time integrating circuit, a switching transistor, operable with the time integrated voltage at the end of the timing interval, means for connecting said time integrating circuit to said switching transistor to trigger said transistor at selectable time intervals, means for producing a warning signal from the output of said transistor at the end of said selectable time interval, a diode in said timing circuit for providing power to said switching transistor when said capacitor is discharged to a voltage where said diode conducts and means for momentarily interrupting the power provided to said timing circuit for reinitiating the time interval of said timing circuit.

2. An aircraft course and turn timer, including a timing circuit having a charging capacitor, a selectable timing interval for producing a time integrated voltage, a switching transistor operable with the time integrated voltage at the end of the timing interval, means for providing power to said timing circuit and said transistor, an emitter-follower transistor connecting said timing circuit to said switching transistor for preventing reverse emitter leakage current from said switching transistor from disturbing the time accuracy of said timing circuit and for triggering said switching transistor at the end of the selectable timing interval of said timing circuit, a diode in the means providing power for conducting current to said emitter-follower transistor when said capacitor is discharged and said emitter-follower transistor is conducting, and means for producing an output warning signal from the output of said switching transistor when said switching transistor is triggered at the end of the selected timing interval of said timing circuit.

3. An aircraft course and turn timer comprising a timing circuit for producing a critical voltage at the end of selectable time intervals and including a selectable series of resistors, a capacitor, means for selecting certain of said resistors for the desired timing interval and means for providing power in a line between said resistors and said capacitor whereby the charging rate of said capacitor is determined by the resistors selected for the time interval desired; a unijunction transistor, operable with the time integrated voltage at the end of the timing interval, means for connecting said timing circuit to said unijunction transistor to trigger said transistor with said time integrated voltage at the end of said time interval, means for producing a warning signal from the output of said unijunction transistor when said unijunction transistor is triggered, and means for shunting said series of resistors for furnishing a short timing interval for testing the timer.

4. An aircraft course and turn timer comprising a timing circuit for producing a critical voltage at the end of selectable time intervals and including a selectable series of resistors, a capacitor, means for selecting certain of said resistors for the desired timing interval and means for providing power in a line between said resistors and said capacitor whereby the charging rate of said capacitor is determined by the resistors selected for the time interval desired, a unijunction transistor operable with the time integrated voltage at the end of the timing interval, means for connecting said time integrating circuit to said unijunction transistor to trigger said transistor with said time integrated voltage at the end of said time interval, means for producing a warning signal from the output of said unijunction transistor when said unijunction transistor is triggered, and means for momentarily interrupting the power provided to said timing circuit for reinitiating the timing interval of said timing circuit.

5. An aircraft course and turn timer comprising a timing circuit for producing a critical voltage at the end of selectable time intervals and including a selectable series of resistors, a capacitor, means for selecting certain of said resistors for the desired timing interval and means for providing power in a line between said resistors and said capacitor whereby the charging rate of said capacitor is determined by the resistors selected for the time interval desired, a unijunction transistor having a rectifying contact and operable with the time integrated voltage at the end of the timing interval, an emitter-follower transistor connecting said timing circuit to said rectifying contact of said unijunction transistor for preventing reverse current from said unijunction transistor from disturbing the time accuracy of said timing circuit and for triggering said transistor with said time integrated voltage at the end of the selected time interval, means for supplying control power to said unijunction transistor, and said emitter-follower transistor, a diode in the means providing power in said timing circuit for providing starting voltage to the timing circut independent of the temperature-dependent valley point voltage of said unijunction transistor, and means for producing a warning signal from the output of said unijunction transistor when said unijunction transistor is triggered by said time integrated voltage, means for momentarily interrupting the power provided to said timing circuit for reinitiating the timing interval of said timing circuit and means for shunting said series of resistors for furnishing a short timing interval for testing the timer.

6. The aircraft course and turn timer in accordance with claim 5 characterized further in that said warning signal means includes both a warning light and means for generating a warning tone connected to the output of said unijunction transistor.

References Cited

UNITED STATES PATENTS

| | | | |
|---|---|---|---|
| 2,906,333 | 9/1959 | Ritzenthaler | 340—309.4 |
| 3,188,622 | 6/1965 | Buhler | 340—23 |
| 3,253,254 | 5/1966 | Buhler | 340—168 |

JOHN W. CALDWELL, *Primary Examiner.*

A. H. WARING, *Assistant Examiner.*